(12) United States Patent
Griffith (10) Patent No.: US 7,717,527 B1
(45) Date of Patent: May 18, 2010

(54) ALLEVIATION OF AIRCRAFT LANDING GEAR LOADING USING A BRAKE CONTROL SCHEME

(75) Inventor: T. Todd Griffith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 11/532,482

(22) Filed: Sep. 15, 2006

(51) Int. Cl.
*B60T 8/86* (2006.01)
*B60T 8/60* (2006.01)

(52) U.S. Cl. .................. 303/126; 303/20; 303/154; 303/155; 303/167; 303/168

(58) Field of Classification Search .............. 303/20, 303/125, 126, 155, 154, 166, 167, 168, 191, 303/198
See application file for complete search history.

(56) References Cited

U.S. PATENT DOCUMENTS

| | | | |
|---|---|---|---|
| 5,615,931 A * | 4/1997 | Stumpe et al. | 303/22.1 |
| 5,816,667 A * | 10/1998 | Jokic | 303/155 |
| 6,095,293 A | 8/2000 | Brundrett et al. | |
| 6,385,522 B1 * | 5/2002 | Pugh | 701/70 |
| 6,702,069 B2 | 3/2004 | Ralea et al. | |
| 6,722,745 B2 * | 4/2004 | Salamat et al. | 303/126 |
| 6,866,348 B2 * | 3/2005 | Ewel | 303/155 |
| 2005/0006953 A1 * | 1/2005 | Versteyhe et al. | 303/191 |
| 2005/0046272 A1 * | 3/2005 | Rieth et al. | 303/155 |

FOREIGN PATENT DOCUMENTS

WO 2007/015997 11/2008

\* cited by examiner

*Primary Examiner*—Thomas J Williams
(74) *Attorney, Agent, or Firm*—Tung & Associates (57) ABSTRACT

An electric brake system for an aircraft employs a brake control process to alleviate high dynamic structural loading of the aircraft landing gear caused by braking maneuvers. The system obtains and processes real-time data—which may include the current aircraft speed, the current brake pedal deflection position, and the current brake pedal deflection rate—to determine how best to control the onset of the brakes. The braking control scheme delays the onset of the desired braking condition to reduce high dynamic loading and lurching of the aircraft.

21 Claims, 4 Drawing Sheets

ALLEVIATION OF AIRCRAFT LANDING GEAR LOADING USING A BRAKE CONTROL SCHEME

TECHNICAL FIELD

Embodiments of the present invention relate generally to an electric brake system for an aircraft. More particularly, embodiments of the present invention relate to a brake control scheme that alleviates structural loading of aircraft landing gear.

BACKGROUND

The wheel brakes of an aircraft are controlled by the pilot after landing to assist in the ground deceleration of the aircraft. The wheel brakes can also be controlled by the pilot (or by a member of the ground crew) during ground taxi maneuvers. The large mass of an aircraft and the high landing speed results in very high momentum, which can translate to very high dynamic loads during braking maneuvers (especially when the brakes are applied suddenly). Consequently, aircraft landing gear are designed to withstand braking loads that are generated in response to the application of the aircraft wheel brakes. This design objective results in heavy and bulky landing gear assemblies.

Hydraulic-based aircraft brake systems may employ techniques intended to alleviate landing gear loads caused by brake actuation. Once such technique switches between fore and aft wheel brakes on a landing gear, while regulating the onset timing of the fore/aft wheel brakes. Although this system results in less lurching of the aircraft during braking, the load alleviation scheme is not based upon current operating conditions of the aircraft, such as the aircraft speed or the rate of brake pedal deflection. Another load alleviation scheme limits the amount of hydraulic fluid and/or the flow rate of hydraulic fluid in a hydraulic brake system. This is a simple mechanical scheme that restricts the brake torque output for all braking and operating conditions. This scheme is always active and it is not based upon current operating conditions of the aircraft, such as the aircraft speed or the rate of brake pedal deflection.

BRIEF SUMMARY

In one embodiment, an electric brake system for an aircraft controls the actuation of an aircraft brake mechanism in a manner that alleviates dynamic loading of the aircraft landing gear during braking. The electric brake system varies the timing related to the onset of the desired brake torque in accordance with the measured speed of the aircraft, the amount of brake pedal deflection, and/or the rate of brake pedal deflection. The braking control scheme results in a smooth application of braking force rather than an abrupt and sudden application of braking force, which can result in high dynamic loading of the aircraft landing gear.

The above and other aspects of the invention may be carried out in one embodiment by a method for alleviating dynamic loading of aircraft landing gear in an aircraft having a landing gear, an electric brake system with a brake mechanism, and a brake pedal. The method involves: obtaining a speed value that indicates a current speed of the aircraft; obtaining brake pedal sensor data in response to engagement of the brake pedal; and actuating the brake mechanism in accordance with a brake application profile that is based upon the speed value and/or the brake pedal sensor data.

The above and other aspects of the invention may be carried out in another embodiment by a control method for an electric brake system in an aircraft. The method involves: obtaining brake pedal sensor data in response to engagement of a brake pedal, the brake pedal sensor data indicating a desired braking condition for a brake mechanism; and electrically controlling actuation of the brake mechanism in response to the brake pedal sensor data. Such control is performed to initially achieve the desired braking condition within a time period after a manipulation of the brake pedal, and to vary the time period in accordance with the brake pedal sensor data.

The above and other aspects of the invention may be carried out in another embodiment by an electric brake system for an aircraft. The electric brake system includes: a brake mechanism; a brake pedal coupled to the brake mechanism; and a brake control architecture coupled to the brake pedal and to the brake mechanism. The brake control architecture includes processing logic configured to obtain a speed value that indicates a current speed of the aircraft, obtain brake pedal sensor data in response to an engagement of the brake pedal, and actuate the brake mechanism in response to the engagement of the brake pedal and in accordance with a brake application profile that is based upon the speed value and/or the brake pedal sensor data.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic representations shown in the figures depict example arrangements of elements, additional intervening elements, devices, features, or components may be present in an embodiment of the invention.

Figure 1:
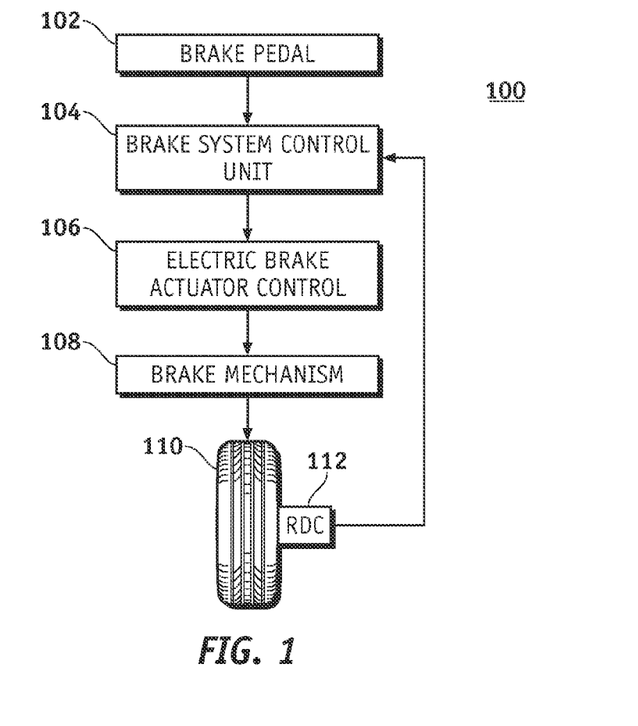
FIG. 1 is a schematic representation of a portion of an electric brake system suitable for use in an aircraft.

FIG. 1 is a schematic representation of a portion of an electric brake system 100 suitable for use in an aircraft (not shown). Electric brake system 100 includes a brake pedal 102, a brake system control unit (BSCU) 104 coupled to brake pedal 102, an electric brake actuator control (EBAC) 106 coupled to BSCU 104, and a brake mechanism 108 coupled to EBAC 106. Brake mechanism 108 corresponds to at least one wheel 110 of the aircraft. Electric brake system 100 may also include an axle-mounted remote data concentrator (RDC) 112 coupled to wheel 110. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 100 can be applied to any number of electric braking configurations for an aircraft, and electric brake system 100 is depicted in a simplified manner for ease of description. An embodiment of electric brake system 100 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 100 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 100. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 100 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and feel if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 104 is implemented with a computer processor (such as a PowerPC 555) that hosts software and provides external interfaces for the software.

BSCU 104 monitors various aircraft inputs to provide control functions such as, without limitation: pedal braking; parking braking; automated braking; and gear retract braking. In addition, BSCU 104 blends antiskid commands (which could be generated internally or externally from BSCU 104) to provide enhanced control of braking BSCU 104 obtains pilot command control signals from brake pedal 102, along with wheel data (e.g., wheel speed, rotational direction, tire pressure, etc.) from RDC 112, as described in more detail below. BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC 555) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 100. Such a brake control architecture includes suitably configured processing logic, functionality, and features that support the load alleviation and brake control operations described herein.

Wheel 110 may include an associated brake mechanism 108. EBAC 106 controls brake mechanism 108 to apply, release, modulate, and otherwise control the actuation of one or more components of brake mechanism 108. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 100 may include or communicate with one or more sensors for wheel 110. These sensors are suitably configured to measure wheel data (wheel speed, direction of wheel rotation, tire pressure, wheel/brake temperature, etc.) for wheel 110, where the wheel data can be utilized by electrical braking system 100. RDC 112 is generally configured to receive, measure, detect, or otherwise obtain data for processing and/or transmission to another component of electric brake system 100. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data to BSCU 104 and EBAC 106.

In this example, electric brake system 100 is suitably configured to control the actuation of brake mechanism 108 in response to the wheel data. In particular, electric brake system 100 is configured to control the actuation of brake mechanism 108 in response to a wheel speed value, which indicates the current speed of the aircraft.

Electric brake system 100 can be utilized to alleviate dynamic structural loads (e.g., landing gear loads) during high effort braking of the aircraft. Electric brake system 100 generally commands brake mechanism 108 to generate brake torque in a manner that is related to the amount that brake pedal 102 is deflected by the pilot. This control can take into account the deflection position of brake pedal 102, the deflection rate of brake pedal 102, and/or the speed at which the aircraft is traveling to modify the actuation of brake mechanism 108 such that the desired brake torque is obtained at a suitable rate that does not develop high peak dynamic loads. This allows the aircraft landing gear to be designed with less weight and bulk, which benefits aircraft performance. In one embodiment, electric brake system 100 uses sensors at brake pedal 102 to measure the deflection and deflection rate of brake pedal 102. Aircraft wheel speed, which may be measured by a sensor at wheel 110, is also used as an input to the brake control laws. BSCU 104 processes these inputs to reduce the initial onset rate of brake application, which in turn reduces the peak brake load that has to be absorbed by the landing gear structure. The brake control laws can be tuned for the particular model of aircraft, static, dynamic, or operational characteristics of the aircraft, and/or static, dynamic, or operational characteristics of brake mechanism 108.

Figure 2:
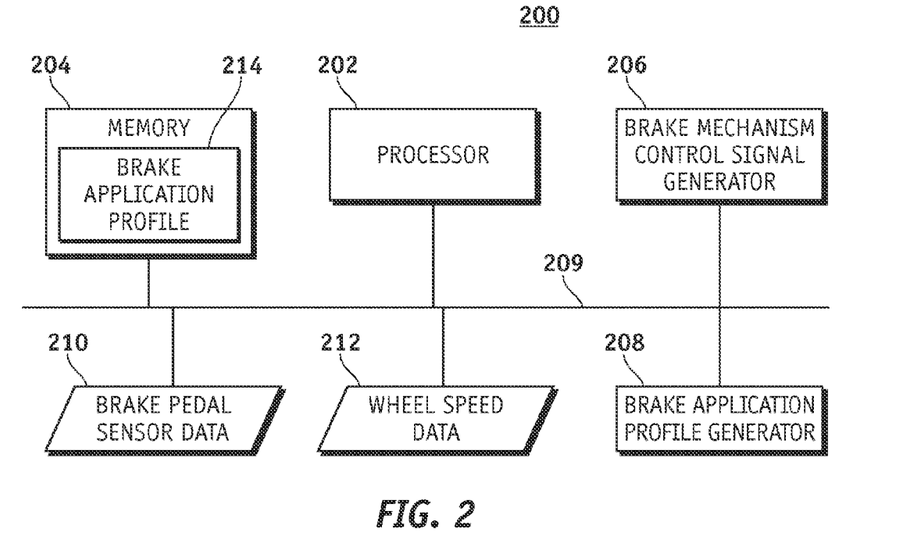
FIG. 2 is a schematic representation of a brake control architecture suitable for use in an electric brake system for an aircraft.

FIG. 2 is a schematic representation of a brake control architecture 200 suitable for use in an electric brake system for an aircraft. Electric brake system 100 may employ an embodiment of brake control architecture 200. For example, brake control architecture 200 may be implemented or realized in BSCU 104 and/or EBAC 106. Brake control architecture 200 may include, without limitation: a processor 202 having suitably configured processing logic; an appropriate amount of memory 204; and a brake mechanism control signal generator 206. Brake control architecture 200 may, but need not, include a brake application profile generator 208. These elements may be coupled together using a data communication bus 209 or any suitably configured interconnection architecture or arrangement. In this embodiment, brake control architecture 200 is configured to obtain and process brake pedal sensor data 210 and wheel speed data 212 in the manner described in more detail below.

Processor 202 may be implemented, performed, or realized in the manner described above for BSCU 104. The processing logic corresponding to processor 202 is designed to carry out various operations and functions associated with the electric brake control scheme described herein. Furthermore, a method or algorithm (or portions thereof) described in connection with the embodiments disclosed herein may be embodied directly in hardware, in firmware, in a software module executed by processor 202, or in any practical combination thereof. A software module may reside in memory 204, which may be realized as one or more physical components having RAM memory, flash memory, ROM memory, EPROM memory, EEPROM memory, registers, a hard disk, a removable disk, a CD-ROM, or any other form of storage medium known in the art. In this regard, memory 204 can be coupled to processor 202 such that processor 202 can read information from, and write information to, memory 204. In the alternative, memory 204 may be integral to processor 202. As an example, processor 202 and memory 204 may reside in an ASIC.

Memory 204 may be configured to store at least one brake application profile 214 for the aircraft. Brake application profile 214 influences the manner in which the brake mechanism is actuated. Brake application profile 214 may be predetermined and programmed into brake control architecture 200 or generated in real-time by brake control architecture 200. In the former situation, brake application profile 214 may be based upon static, dynamic, aerodynamic, operational, and/or other characteristics of the aircraft (e.g., the mass of the aircraft and the typical landing speed of the aircraft) and/or based upon static, dynamic, operational and/or other characteristics of the electric brake system or brake mechanism (e.g., the response time of the control elements, the maximum achievable brake torque, and the typical range of brake torque). In the latter situation, the optional brake application profile generator 208 may be utilized to generate brake application profile 214 dynamically in response to brake pedal sensor data 210 and/or in response to wheel speed data 212. The operation of brake application profile generator 208 may also be influenced by aircraft characteristics and/or brake mechanism characteristics as mentioned above. In practice, brake application profile generator 208 may be realized in the processing logic of processor 202.

Figure 3:
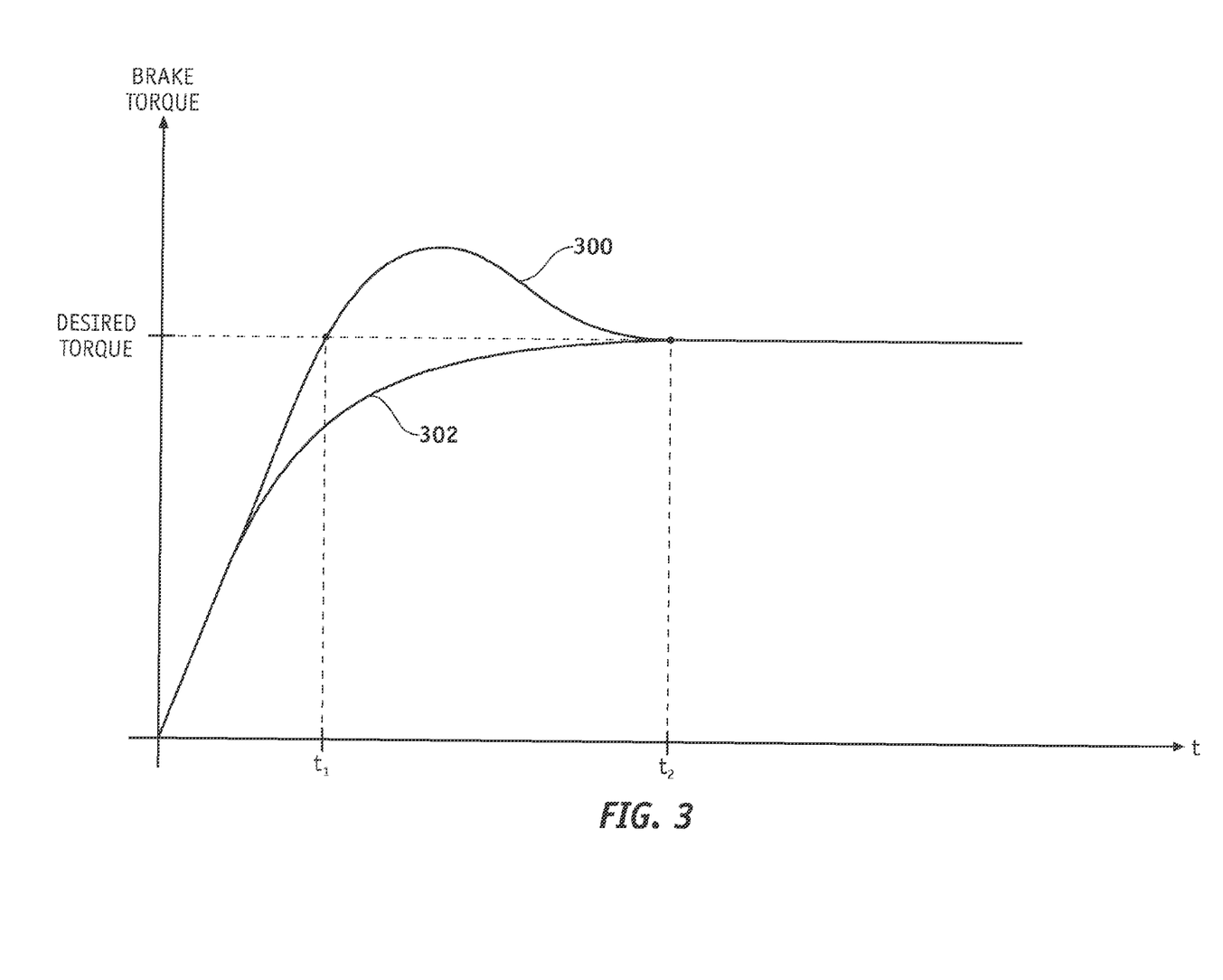
FIG. 3 is a graph that illustrates brake torque characteristics over time for an electric brake system.

FIG. 3 is a graph that illustrates brake torque characteristics over time for an electric brake system. An embodiment of brake control architecture 200, however, may handle different types of brake application profiles and it need not be limited to profiles that indicate brake torque characteristics. For example, a brake application profile may instead represent, without limitation: brake actuator position over time; applied brake clamping force over time; a brake modulation scheme; or the like.

The graph in FIG. 3 represents two possible brake application profiles for a brake mechanism: an uncompensated profile 300; and an adjusted profile 302. The early and late portions of both profiles are virtually identical and, therefore, the graphs appear to overlap. Both profiles indicate the same desired brake torque corresponding to a given pilot manipulation of a brake pedal. Ultimately, this desired brake torque is reached by both profiles. Uncompensated profile 300 quickly reaches the desired brake torque at a time $t=t_1$, overshoots the desired brake torque, and eventually settles back to the desired brake torque at a time $t=t_2$. The steep rise time of uncompensated profile 300 results in sudden application of the brakes, a lurching of the aircraft, and relatively high dynamic loading of the landing gear. This dynamic stress is compounded by the overshooting of uncompensated profile 300 above the desired brake torque. In contrast, adjusted profile 302 gradually increases the brake torque such that the desired brake torque is not initially reached until the time $t=t_2$. In this manner, adjusted profile 302 smoothes out the actuation of the brake mechanism to reduce the lurching effect and, therefore, alleviate dynamic structural loading of the landing gear. Moreover, adjusted profile 302 prevents overshooting above the desired brake torque. Depending upon the aircraft, the brake system characteristics, the operating conditions, and the pilot input, the difference $(t_2-t_1)$ may be approximately 0.25 to 1.00 second. This time difference will have little, if any, noticeable effect on normal aircraft landing operations.

Brake mechanism control signal generator 206, which may be realized in the processing logic of processor 202, is suitably configured to generate control signals for the aircraft brake mechanism(s). Referring to FIG. 1, brake mechanism control signal generator 206 may be implemented in BSCU 104 and configured to generate or influence EBAC control signals, and/or implemented in EBAC 106 and configured to generate or influence brake mechanism control signals. As described in more detail below, brake application profile 214 may influence or govern the operation of brake mechanism control signal generator 206 to alleviate dynamic structural loading of the aircraft landing gear.

Figure 4:
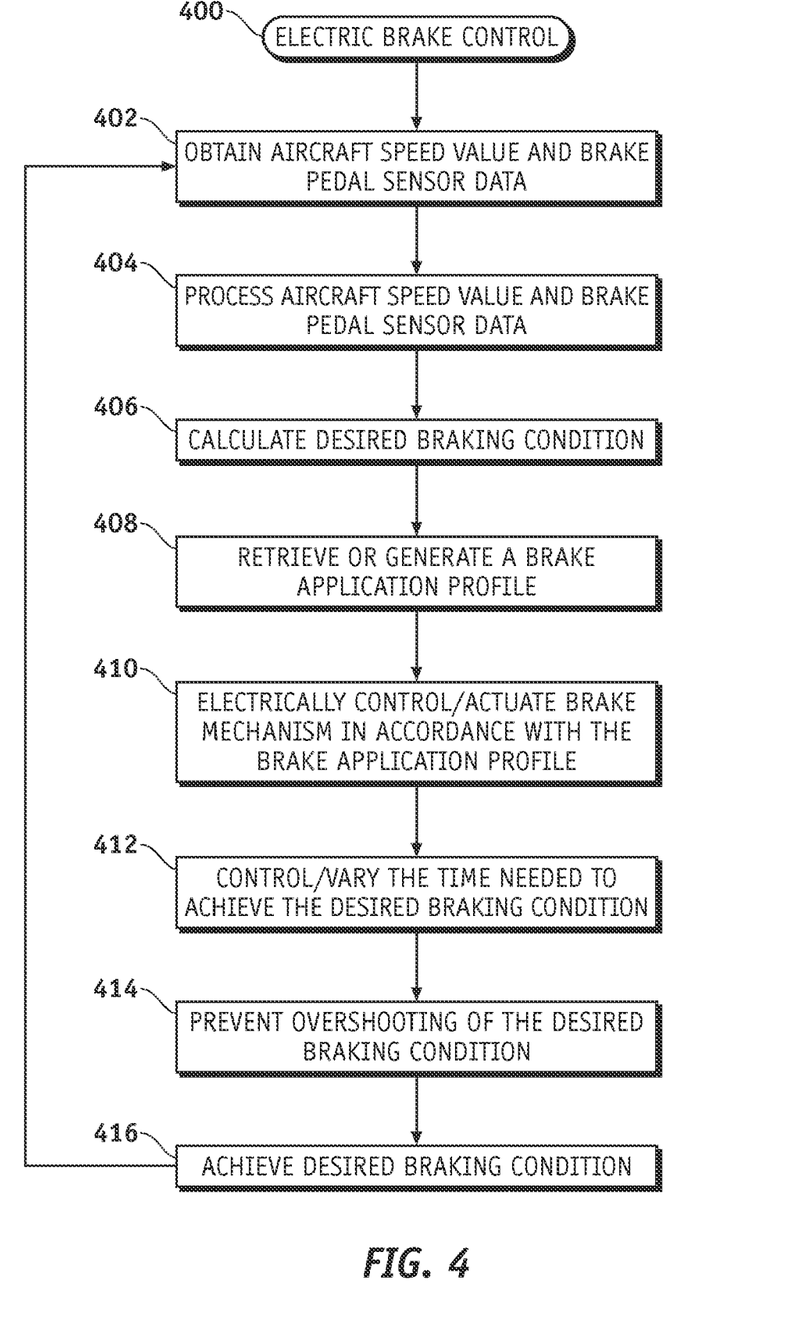
FIG. 4 is a flow chart that illustrates an electric brake control process.

FIG. 4 is a flow chart that illustrates an electric brake control process 400. Process 400 can be utilized to alleviate structural loading of aircraft landing gear using the electric brake system of the aircraft. The various tasks performed in connection with process 400 may be performed by software, hardware, firmware, or any combination thereof. For illustrative purposes, the following description of process 400 may refer to elements mentioned above in connection with FIGS. 1-3. In embodiments of the invention, portions of process 400 may be performed by different elements of the described system, e.g., the BSCU, the EBAC, or the brake mechanism. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Electric brake control process 400 may begin by obtaining a speed value and/or brake pedal sensor data for the aircraft (task 402). The speed value indicates the current speed of the aircraft. For this example, the speed value is a wheel speed value corresponding to the speed of a landing gear wheel, and the wheel speed value may be obtained from a suitably configured wheel sensor. The brake pedal sensor data is obtained in response to engagement of the brake pedal (this engagement usually corresponds to physical manipulation of the brake pedal by a pilot or a ground crew member). The brake pedal sensor data may indicate, include, or represent one or more of the following, without limitation: deflection position data for the brake pedal; deflection rate data for the brake pedal; a desired braking condition for the brake mechanism (e.g., a brake actuator position, an amount of brake torque, or a percentage of full braking capacity).

In this example, electric brake control process 400 obtains and processes (task 404) both the aircraft speed value and the brake pedal sensor data. Depending upon the implementation of the electric brake system, process 400 may calculate or derive a desired braking condition (task 406) from the speed value and/or from the brake pedal sensor data. In addition, process 400 retrieves or generates an appropriate brake application profile for the current operating conditions (task 408). For example, process 400 may access a stored profile that is based upon the current aircraft speed and/or the current brake pedal sensor data. Alternatively, process 400 may utilize a suitable algorithm to generate a desired profile in response to the current aircraft speed and the current brake pedal sensor data. In this regard, FIG. 5 is a graph that illustrates brake torque characteristics over time for an electric brake system under different operating conditions.

Figure 5:
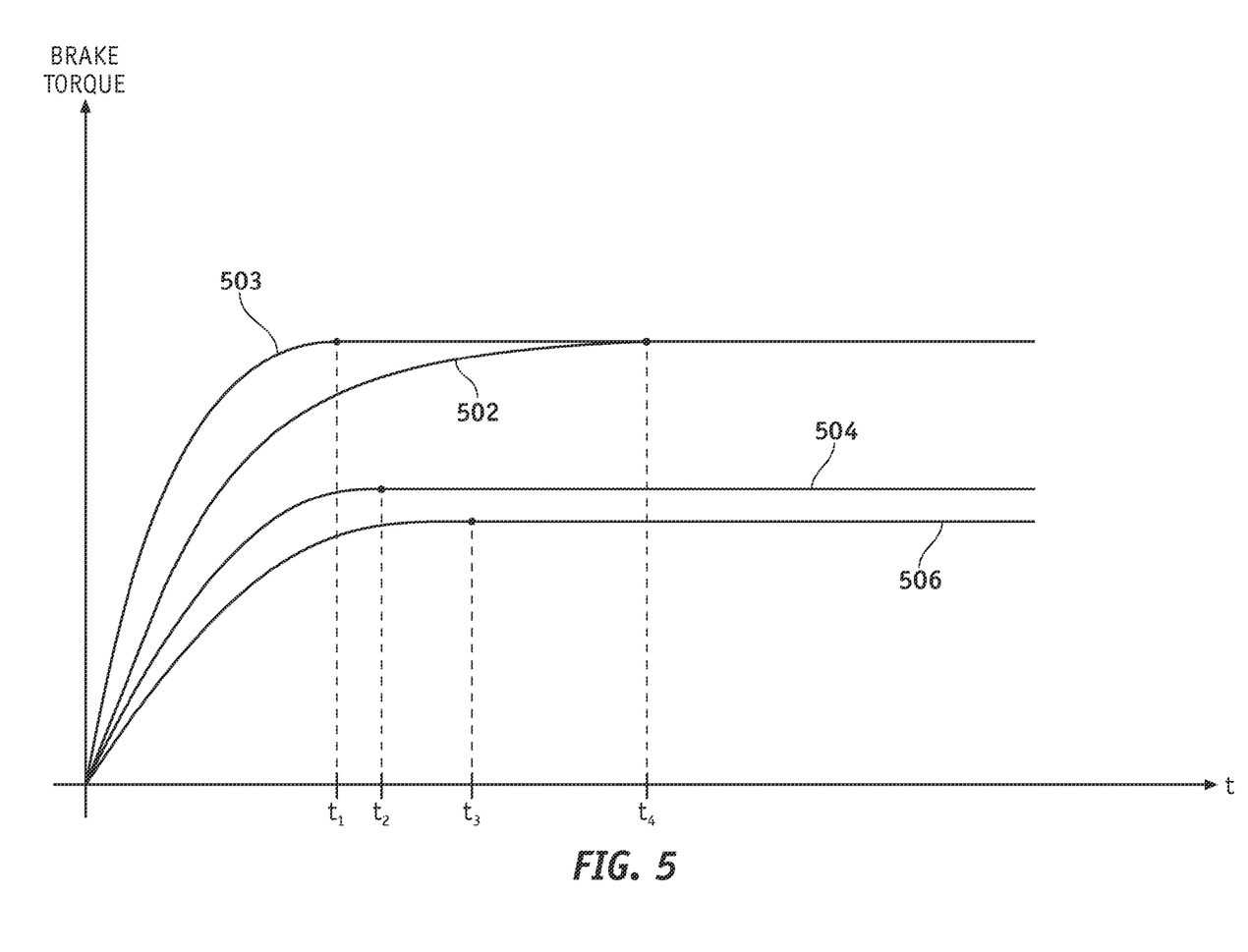
FIG. 5 is a graph that illustrates brake torque characteristics over time for an electric brake system under different operating conditions.

FIG. 5 depicts different brake application profiles that may be generated or retrieved during process 400. Brake application profile 502 is associated with a relatively high desired brake torque, a relatively long deflection position for the brake pedal, and a relatively long time period $(t_4)$ to initially achieve the desired brake torque following a manipulation of the brake pedal. This manipulation of the brake pedal may be an initial deflection of the brake pedal or a subsequent change in a current deflection of the brake pedal. As described above in connection with FIG. 3, the electric brake system initially achieves the desired braking condition when the brake torque first reaches the desired value. The profiles illustrated in FIG. 5 prevent overshooting of the desired brake torque during actuation of the brake mechanism. Therefore, the designated time periods represent the time it takes for the electric brake system to initially achieve the desired braking condition.

Brake application profile 503 is associated with a relatively high desired brake torque, a relatively long deflection position for the brake pedal, and a relatively short time period $(t_1)$ to achieve the desired brake torque. Brake application profile 504 is associated with a relatively intermediate desired brake torque, a relatively intermediate deflection position for the brake pedal, and a relatively short time period $(t_2)$ to achieve the desired brake torque. Brake application profile 506 is associated with a relatively low desired brake torque, a relatively short deflection position for the brake pedal, and a relatively intermediate time period $(t_3)$ to achieve the desired brake torque. As shown in FIG. 5, a brake application profile influences the time period for initially achieving the desired brake torque.

In one embodiment, the given brake application profile increases this time period when the current speed of the aircraft is relatively low, and decreases the time period when the current speed of the aircraft is relatively high. This characteristic contemplates the relatively low coefficient of dynamic friction between the aircraft tires and the ground under high speed conditions where the wings are still providing lift to the aircraft (and, conversely, the relatively high coefficient of dynamic friction under low speed conditions where the full weight of the aircraft is carried by the tires). Thus, brake application profile 502 may represent a relatively low speed condition for the aircraft, and brake application profile 503 may represent a relatively high speed condition for the aircraft, where the desired brake torque is the same.

In one embodiment, the given brake application profile increases the time period when the brake pedal sensor data indicates a relatively long deflection position for the brake pedal, and decreases the time period when the brake pedal sensor data indicates a relatively short deflection position for the brake pedal. This characteristic contemplates the need to reduce sudden application of brakes during hard braking maneuvers. Conversely, the load alleviation technique described herein may not be necessary under relatively soft or gentle braking maneuvers. Thus, brake application profile 502 may correspond to a relatively long brake pedal deflection, and brake application profile 504 may correspond to a relatively short brake pedal deflection.

In one embodiment, the given brake application profile increases the time period when the brake pedal sensor data indicates a relatively high deflection rate for the brake pedal, and decreases the time period when the brake pedal sensor data indicates a relatively low deflection rate for the brake pedal. This characteristic contemplates the need to "feather" the application of brakes in response to a rapid engagement of the brake pedal. Conversely, the load alleviation technique described herein may not be necessary when the brake pedal is deflected slowly. Thus, brake application profile 506 may correspond to a relatively high deflection rate, and brake application profile 504 may correspond to a relatively low deflection rate. As illustrated by this example, the different criteria for influencing a brake application profile need not be correlated; even though brake application profile 504 corresponds to a higher desired brake torque compared to brake application profile 506, the time period for brake application profile 504 is less than the time period for brake application profile 506.

Referring again to FIG. 4, electric brake process 400 electrically controls and actuates the brake mechanism (or mechanisms) in accordance with the particular brake application profile (task 410). In practice, the actuation of the brake mechanism will be responsive to the engagement and manipulation of the brake pedal and, in turn, responsive to the real-time brake pedal sensor data. For this example, the actuation of the brake mechanism is also responsive to the aircraft speed data. As explained above, the electric brake system controls/varies the time needed to achieve the desired braking condition (task 412) in accordance with the brake pedal sensor data and/or the aircraft speed data, which may be contemplated by the current brake application profile. In certain embodiments, process 400 prevents overshooting of the desired braking condition (task 414) by following the current brake application profile.

Eventually, electric brake process 400 will achieve the desired braking condition (task 416) for the current operating conditions and pilot input. FIG. 4 is depicted as a loop so that process 400 can be continuously performed to react to the current conditions and any changes in pilot input.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. In an aircraft having a landing gear, an electric brake system with a brake mechanism, and a brake pedal, a method for alleviating dynamic loading of the landing gear using the electric brake system, the method comprising:
   obtaining a speed value that indicates a current speed of the aircraft;
   obtaining brake pedal sensor data in response to engagement of the brake pedal;
   determining a desired braking condition from said speed value and/or the brake pedal sensor data; and,
   actuating the brake mechanism in accordance with a brake application profile, said brake application profile representing a predetermined or real-time generated application of a brake condition over a time period to achieve said desired braking condition within said time period without overshooting said desired braking condition, wherein said time period is varied in response to said determined desired braking condition to control a rate of application of braking force while avoiding abrupt application of said braking force to achieve said desired braking condition.

2. A method according to claim 1, wherein obtaining the speed value comprises obtaining a wheel speed value for a wheel of the landing gear.

3. A method according to claim 1, wherein obtaining brake pedal sensor data comprises obtaining a deflection position for the brake pedal.

4. A method according to claim 1, wherein obtaining brake pedal sensor data comprises obtaining a deflection rate for the brake pedal.

5. A method according to claim 1, wherein the brake application profile represents brake torque over time for the brake mechanism.

6. A method according to claim 5, wherein:
   the brake pedal sensor data indicates a desired brake torque for the brake mechanism; and
   the brake application profile prevents overshooting of the desired brake torque during actuation of the brake mechanism.

7. A method according to claim 1, further comprising:
   processing the speed value and the brake pedal sensor data; and
   generating the brake application profile in real-time in response to the processing.

8. A method according to claim 1, further comprising:
   processing the speed value and the brake pedal sensor data; and
   retrieving the brake application profile in response to the processing.

9. A method according to claim 1, wherein:
   the brake pedal sensor data indicates said desired braking condition for the brake mechanism;
   the electric brake system initially achieves the desired braking condition within said time period after a manipulation of the brake pedal; and
   the brake application profile influences the time period.

10. A method according to claim 9, wherein the brake application profile increases the time period when the current speed of the aircraft is relatively low, and decreases the time period when the current speed of the aircraft is relatively high.

11. A method according to claim 9, wherein the brake application profile increases the time period when the brake pedal sensor data indicates a relatively long deflection position for the brake pedal, and decreases the time period when the brake pedal sensor data indicates a relatively short deflection position for the brake pedal.

12. A method according to claim 9, wherein the brake application profile increases the time period when the brake pedal sensor data indicates a relatively high deflection rate for the brake pedal, and decreases the time period when the brake pedal sensor data indicates a relatively low deflection rate for the brake pedal.

13. A control method for an electric brake system in an aircraft, the method comprising:
    obtaining brake pedal sensor data in response to engagement of a brake pedal, the brake pedal sensor data indicating a desired braking condition for a brake mechanism; and
    electrically controlling actuation of the brake mechanism in response to the brake pedal sensor data to:
        initially achieve the desired braking condition within a time period after a manipulation of the brake pedal; and
        vary the time period in accordance with the brake pedal sensor data;
    wherein electrically controlling actuation of the brake mechanism increases the time period when the brake pedal sensor data indicates a relatively long deflection position for the brake pedal, and decreases the time period when the brake pedal sensor data indicates a relatively short deflection position for the brake pedal.

14. A method according to claim 13, further comprising obtaining a speed value that indicates a current speed of the aircraft, wherein electrically controlling actuation of the brake mechanism further comprises electrically controlling actuation of the brake mechanism in response to the speed value to vary the time period in accordance with the speed value.

15. A method according to claim 13, further comprising:
    accessing a brake application profile that is based upon the brake pedal sensor data; and
    actuating the brake mechanism in accordance with the brake application profile.

16. A method according to claim 13, wherein electrically controlling actuation of the brake mechanism increases the time period when the brake pedal sensor data indicates a relatively high deflection rate for the brake pedal, and decreases the time period when the brake pedal sensor data indicates a relatively low deflection rate for the brake pedal.

17. An electric brake system for an aircraft, the electric brake system comprising:
    a brake mechanism;
    a brake pedal coupled to the brake mechanism; and
    a brake control architecture coupled to the brake pedal and to the brake mechanism, the brake control architecture comprising processing logic configured to:
        obtain a speed value that indicates a current speed of the aircraft;
        obtain brake pedal sensor data in response to an engagement of the brake pedal;
        determine a desired braking condition from said speed value and/or the brake pedal sensor data; and,
        actuate the brake mechanism in response to the engagement of the brake pedal and in accordance with a brake application profile, said brake application profile representing a predetermined or real-time generated application of a brake condition over a time period to achieve said desired braking condition within said time period without overshooting said desired braking condition, wherein said time period is varied in response to said determined desired braking condition to control a rate of application of braking force while avoiding abrupt application of said braking force to achieve said desired braking condition.

18. An electric brake system according to claim 17, wherein the brake application profile represents brake torque over time for the brake mechanism.

19. An electric brake system according to claim 17, wherein:
    the brake pedal sensor data indicates said desired braking condition for the brake mechanism;
    the electric brake system initially achieves the desired braking condition within said time period after a manipulation of the brake pedal; and
    the brake application profile influences the time period.

20. An electric brake system according to claim 17, wherein the brake application profile is based upon characteristics of the aircraft.

21. An electric brake system according to claim 17, wherein the brake application profile is based upon characteristics of the brake mechanism.

* * * * *